United States Patent [19]

Sublett et al.

[11] Patent Number: 5,399,595
[45] Date of Patent: Mar. 21, 1995

[54] FOAMABLE COPOLYESTERS

[75] Inventors: Bobby J. Sublett; Richard L. McConnell, both of Kingsport, Tenn.

[73] Assignee: Eastman Chemical Company, Kingsport, Tenn.

[21] Appl. No.: 293,628

[22] Filed: Aug. 22, 1994

[51] Int. Cl.⁶ .................................................. C08J 9/04
[52] U.S. Cl. .......................................... 521/182; 521/79
[58] Field of Search ................................. 521/182, 79

[56] References Cited

U.S. PATENT DOCUMENTS 5,229,432  7/1993  Muschiatti ........................... 54/182
5,234,640  8/1993  Amano et al. ...................... 521/182

*Primary Examiner*—Morton Foelak
*Attorney, Agent, or Firm*—John F. Stevens; Harry J. Gwinnell

[57] ABSTRACT

Disclosed are foamable copolyester compositions containing 0.5 to 5.0 mole percent of a dicarboxylic acid sulfomonomer which contains at least one metal sulfonate group attached to an aromatic nucleus. These copolyesters possess high melt viscosity and are readily foamable with a wide range of foaming agents to provide low density shaped articles, films, and sheets.

3 Claims, No Drawings

FOAMABLE COPOLYESTERS

FIELD OF THE INVENTION

This invention relates to high molecular weight copolyester compositions which possess high melt viscosity and melt strength and which can be foamed with a wide range of foaming agents. More particularly, this invention pertains to copolyesters containing 0.5 to 5.0 mole percent of a dicarboxylic acid sulfomonomer containing at least one metal sulfonate group attached to an aromatic nucleus, and to foamed articles produced therefrom which exhibit good appearance and good impact properties.

BACKGROUND OF THE INVENTION

Many polymeric materials are foamed to provide low density articles such as films, cups, food trays, decorative ribbons, and furniture parts. For example, polystyrene beads containing low boiling hydrocarbons such as pentane are formed into lightweight foamed cups for hot drinks such as coffee, tea, hot chocolate, and the like. Polypropylene can be extruded in the presence of blowing agents such as nitrogen or carbon dioxide gas to provide decorative films and ribbons for package wrappings. Also, polypropylene can be injection molded in the presence of these blowing agents to form lightweight furniture parts such as table legs and to form lightweight chairs.

Polyesters such as poly(ethylene terephthalate) have a much higher density (e.g. about 1.3 g/cc) than other polymers. Therefore, it would be desirable to be able to foam polyester materials to decrease the weight of molded parts, films, sheets, food trays, and the like. Such foamed articles also have better insulating properties than unfoamed parts. However, it is difficult to foam such polyester materials because of the low melt viscosity and low melt strength of typical poly(ethylene terephthalate) and related polyester polymers. The low melt viscosity and low melt strength of the polyesters is a problem because the polymer melt will not adequately retain the bubbles of an expanding gas. It would be desirable therefore to be able to provide polyester polymers which could be foamed with conventional foaming systems.

One approach to providing polyesters having high melt viscosities involves treating preformed polyesters with multifunctional carboxylic acids or polyols to provide branched polyesters. Such compositions are disclosed in U.S. Pat. Nos. 4,132,707; 4,145,466; 4,999,388; 5,000,991; 5,110,844; 5,128,383; and 5,134,028. The branching agents used include tri- and tetracarboxylic acids and anhydrides such as trimesic acid, pyromellitic acid, and pyromellitic dianhydride or polyols such as trimethylolpropane and pentaerythritol. These branching agents will provide polyesters with increased melt viscosities but their use is often disadvantageous. For one thing, the branching agent cannot be put into the initial reaction mixture of polyester reagents because this will lead to crosslinked structures. If added after the polyester is formed, an additional processing step is required and the branching action is hard to control. For example, the branching reaction may proceed too far, providing crosslinked materials which are intractable.

It has now been found that a wide range of polyester compositions can be modified with small amounts of a dicarboxylic acid sulfomonomer to provide copolyester compositions with increased melt viscosities which have good foaming characteristics. Polymers suitable for foaming must have a melt viscosity which is sufficient to retain the bubbles of an expanding gas during molding or extrusion operations. Good melt viscosity is also essential for the manufacture of rigid foams and foamed containers having uniform wall thickness.

Polyesters containing dicarboxylic acid sulfomonomers are disclosed in U.S. Pat. Nos. 3,734,874; 3,779,993; 4,335,220; 4,233,196; 3,853,820; and 5,053,482. U.S. Pat. Nos. 3,734,874 and 4,233,196 are concerned with amorphous water dispersible polyesters which contain at least 8 mole percent of a sulfomonomer and substantial amounts of a difunctional glycol component. U.S. Pat. No. 3,853,820 describes an amorphous water dissipatable polyester with at least 20 mole percent of a poly(ethylene glycol) which is a condensation polymer of ethylene glycol. In addition, U.S. Pat. No. 5,053,482 describes fiber and film forming polyesters based on polyethylene terephthalate polyesters containing 20 to 40 mole percent of diethylene glycol for use in disposable products such as disposable diapers. In contrast, the polyesters of the present invention are crystalline hydrophobic polyesters containing a diol component which consists essentially of ethylene glycol, 1,4-butanediol, 1,6-hexanediol, or 1,4-cyclohexane-dimethanol.

Other patents of interest include U.S. Pat. Nos. 4,499,262; 4,579,936 and U.S. patent application Ser. No. 848,469 filed Mar. 9, 1992. These references are concerned with bottle polymer compositions and do not anticipate their use in foamable compositions.

Summary of the Invention

Accordingly, one object of the present invention is to provide crystalline hydrophobic polyesters which possess sufficient melt viscosity to be foamed into useful sheets, films, or molded objects.

Another object of the invention is to provide compositions containing an aromatic dicarboxylic acid, a dicarboxylic acid sulfomonomer and at least one aliphatic or cycloaliphatic glycol which are foamable to produce articles exhibiting good impact strength and appearance.

These and other objects are accomplished herein by providing a copolyester having an I.V. of about 0.70–1.20 dl/g and a melt viscosity sufficiently high to permit foaming during extrusion or molding operations, the copolyester consisting essentially of (A) repeat units from about 99.5 to about 95 mol% of an aromatic dicarboxylic acid having 8 to 12 carbon atoms and about 0.5 to about 5.0 mol % of a dicarboxylic acid sulfomonomer containing at least one metal sulfonate group attached to an aromatic nucleus, and (B) repeat units from at least one aliphatic or cycloaliphatic diol having 2 to 8 carbon atoms, the mol % being based on 100 mol % dicarboxylic acid and 100 mol % diol.

Also, according to the present invention there is provided a method of increasing the melt viscosity and melt strength of a copolyester used in producing a foamed article, the copolyester consisting essentially of repeat units from 100 mol % of a dicarboxylic acid component and repeat units from a diol component, the method comprising copolymerizing into the copolyester about 0.5 to about 5.0 mol % of a dicarboxylic acid sulfomoner containing at least one metal sulfonate group attached to an aromatic nucleus.

Description of the Invention

The polyesters of the present invention consist essentially of repeat units from terephthalic or naphthalenedicarboxylic acid, a dicarboxylic acid sulfomonomer and an aliphatic or cycloaliphatic glycol, based on 100 mole percent dicarboxylic acid and 100 mole percent diol. The term "consisting essentially of" means that in addition to the terephthalic or naphthalenedicarboxylic acid, dicarboxylic acid sulfomonomer and main glycol component, other dicarboxylic acids and diols may be present in the copolyester provided that the basic and essential characteristics of the polyester are not materially affected thereby.

For example, the polyesters of the present invention may optionally be modified with up to about 25 mole percent, based on 100 mole percent dicarboxylic acid, of one or more different dicarboxylic acids other than terephthalic acid or suitable synthetic equivalents, and the dicarboxylic acid sulfomonomer. Such additional dicarboxylic acids include aromatic dicarboxylic acids preferably having 8 to 14 carbon atoms, aliphatic dicarboxylic acids preferably having 4 to 12 carbon atoms, or cycloaliphatic dicarboxylic acids preferably having 8 to 12 carbon atoms. Examples of dicarboxylic acids to be included with terephthalic acid and the dicarboxylic acid sulfomonomer are: phthalic acid, isophthalic acid, 1,4-cyclohexanedicarboxylic acid, 1,4-naphthalenedicarboxylic acid, 2,5-naphthalenedicarboxylic acid, 2,6-naphthalenedicarboxylic acid, 2,7-naphthalenedicarboxylic acid, cyclohexanediacetic acid, diphenyl-4,4'-dicarboxylic acid, succinic acid, sebacic acid, suberic acid, adipic acid, glutaric acid, azelaic acid, fumaric acid, maleic acid, itaconic acid, and the like. Polyesters may be prepared from two or more of the above dicarboxylic acids.

It should be understood that use of the corresponding acid anhydrides, esters, and acid chlorides of these acids is included in the term "dicarboxylic acid".

In addition, the polyesters of the present invention may optionally be modified with up to about 25 mole percent, based on 100 mole percent diol, of one or more different diols other than ethylene glycol. Such additional diols include cycloaliphatic diols preferably having 3 to 8 carbon atoms. Examples of such diols to be included with ethylene glycol are: 1,4-cyclohexanedimethanol, diethylene glycol, 1,3-propanediol, 1,3-butanediol, 1,4-butanediol, 1,5-pentanediol, 1,3-hexanediol, 3-methyl-2,4-pentanediol, 2-methyl-1,4-pentanediol, 2,2,4-trimethyl-1,3-pentanediol, 2,2-dimethyl-1,3-propanediol, 2,2-diethyl-1,3-propanediol, 2-ethyl-2-butyl-1,3-propanediol, 2-ethyl-2-isobutyl-1,3-propanediol, 1,6-hexanediol, 2,2,4-trimethyl-1,6-hexanediol, thiodiethanol, 2-ethyl-1,3-hexanediol, 1,4-di-(hydroxyethoxy)-benzene, 2,2-bis-(4-hydroxycyclohexyl)propane, 2,2-bis-(3-hydroxyethoxyphenyl)propane, 2,2-bis-(4-hydroxypropoxyphenyl)propane, and the like. Polyesters may be prepared from two or more of the above diols.

The dicarboxylic acid sulfomonomer component of the polyester is a dicarboxylic acid or ester thereof containing a metal sulfonate group. The metal ion of the sulfonate salt may be $Na+$, $Li+$, $K+$ and the like. The sulfonate salt group is attached to an aromatic acid nucleus such as a benzene, naphthalene, diphenyl, oxydiphenyl, sulfonyldiphenyl, or methylenediphenyl nucleus. Preferably, the sulfomonomer is sulfophthalic acid, sulfoterephthalic acid, sulfoisophthalic acid, 4-sulfonaphthalene-2,7-dicarboxylic acid, and their esters. Most preferably, the sulfomonomer is 5-sodiosulfoisophthalic acid or its dialkyl esters such as the dimethyl ester.

The dicarboxylic acid sulfomonomer is present in a critical amount of about 0.5 to about 5 mole percent based on the total acid content. The absence of the dicarboxylic acid sulfomonomer in the polyethylene terephthalate compositions of the present invention results in polyesters with melt viscosities too low for useful foaming characteristics. Consequently, the polyesters with less than 0.5 mole percent sulfomonomer do not have sufficient melt viscosity to be foamed successfully.

In addition to the presence of the dicarboxylic acid sulfomonomer, the polyesters of the present invention must also have high molecular weight in order to achieve sufficient melt viscosity to be foamed. High molecular weight polyesters for the purpose of this invention are defined as polyesters having an inherent viscosity (I.V.) of greater than 0.70 dl/g. It is important to note that a correlation exists between the I.V. of the polyester and the amount of dicarboxylic acid sulfomonomer required to provide the polyesters with sufficient melt viscosity to be useful for foaming. For example, polyesters having an I.V. of about 0.75 dl/g require about 2 to about 5 mole percent of the sulfomonomer. Polyesters having an I.V. of about 1.0 dl/g to 1.1 dl/g require only about 0.5 to about 2 mole percent of the sulfomonomer to be useful for foaming. Thus, the amount of the dicarboxylic acid sulfomonomer added is generally inversely proportional to the inherent viscosity of the polyester.

To achieve the high molecular weight polyesters which are necessary for the present invention, it is necessary to use a combination of melt phase and solid state polymerization. The combination is used because polymerization in the melt phase to high molecular weight causes thermal degradation of the polymer. In the melt polymerization, the dicarboxylic acids or ester forming derivatives thereof, and one or more diols are heated in the presence of esterification and/or polyesterification catalysts at temperatures in the range of about 150° C. to about 300° C., and pressures of atmospheric to about 0.2 mm Hg. Normally, the dicarboxylic acids or derivatives thereof are esterified or transesterified with the diol(s) at atmospheric pressure and at a temperature at the lower end of the specified range. Polycondensation then is effected by increasing the temperature and lowering the pressure while excess diol is removed from the mixture. The polycondensation reaction is continued until the inherent viscosity of the polymer melt reaches about 0.35 dl/g or greater. At this point, the melt is cooled to produce a solid which is pelletized, chopped, granulated, or powdered.

The pellets or other solid forms are then subjected to a solid state polymerization wherein diol is removed by circulating or blowing an inert gas, such as nitrogen, through the pellets. A polycondensation reaction is conducted in the solid state. The solid state polycondensation reaction is continued until the inherent viscosity of the polymer reaches about 0.70 dl/g or greater.

The polymer compositions of this invention are readily foamed by a wide variety of methods. These include the injection of an inert gas such as nitrogen or carbon dioxide into the melt during extrusion or molding operations. Alternatively, inert hydrocarbon gases such as methane, ethane, propane, butane, and pentane, or chlorofluorocarbons, hydrochlorofluorocarbons and the like may be used. Another method involves the dry blending of organic blowing agents with the polyester and then extrusion or molding the compositions to provide foamed articles. During the extrusion or molding operation, an inert gas such as nitrogen is released from the blowing agents and provides the foaming action. Typical blowing agents include azodicarbonamide, hydrazocarbonamide, dinitrosopentamethylenetetramine, p-toluenesulfonyl hydrazodicarboxylate, 5-phenyl-3,6-dihydro-1,3, 4-oxadiazin-2-one, sodium borohydride, sodium bicarbonate, 5-phenyltetrazole, p,p'-oxybis (benzenesulfonylhydrazide), and the like. Still another method involves the blending of sodium carbonate or sodium bicarbonate with one portion of polyester pellets, the blending of an organic acid such as citric acid with another portion of polyester pellets and then a blend of the two types of pellets are extruded or molded at elevated temperatures. Carbon dioxide gas released from the interaction of the sodium carbonate and citric acid provide for the foaming action in the melt.

In many cases, nucleating agents such as talc, $TiO_2$, or small amounts of polyolefin materials such as polyethylene, polypropylene, ethylene, or propylene copolymers and the like are also beneficial additives for the foamable polyester compositions. Certain nucleating agents are important to create sites for bubble initiation and to influence the cell size of the foamed sheet or foamed object.

Patents disclosing various foaming procedures and equipment include U.S. Pat. Nos. 5,116,881; 5,134,028; 4,626,183; 5,128,383; 4,746,478; 5,110,844; 5,000,991; and 4,761,256. Other background information on foaming technology may be found in Kirk-Othmer Encyclopedia of Chemical Technology, Third Edition,. Volume 11, pp 82–145 (1980), John Wiley and Sons, Inc., New York, N.Y., and the Encyclopedia of Polymer Science and Engineering, Second Edition, Volume 2, pp 434–446 (1985), John Wiley and Sons, Inc., New York, N.Y.

Many other ingredients can be added to the compositions of the present invention to enhance the performance properties of the blends. For example, buffers, antioxidants, metal deactivators, colorants, phosphorus stabilizers, impact modifiers, nucleating agents, ultraviolet light and heat stabilizers, and the like, can be included herein. All of these additives and the use thereof are well known in the art and do not require extensive discussions. Therefore, only a limited number will be referred to, it being understood that any of these compounds can be used so long as they do not hinder the present invention from accomplishing its objects.

Desirable additives include impact modifiers and antioxidants. Examples of typical commercially available impact modifiers well-known in the art and useful in this invention include ethylene/propylene terpolymers, styrene based block copolymers, and various acrylic tore/shell type impact modifiers. The impact modifiers may be used in conventional amounts of from 0.1 to 25 weight percent of the overall composition and preferably in amounts from 0.1 to 10 weight percent of the composition. Examples of typical commercially available antioxidants useful in this invention include, but are not limited to, hindered phenols, phosphites, diphosphites, polyphosphites, and mixtures thereof. Combinations of aromatic and aliphatic phosphite compounds may also be included.

The materials and testing procedures used for the results shown herein are as follows:

Inherent viscosity (I.V.) is measured at 25° C. using 0.50 grams of polymer per 100 mL of a solvent consisting of 60% by weight phenol and 40% by weight tetrachloroethane.

Melt Strength and Die Swell are determined according to ASTM D3835 by extruding the molten polyester downward through a die 0.1 inch in diameter and 0.25 inches long at a shear rate of 20 second$^{-1}$ using an Instron rheometer and allowing the extrudate to fall freely. Die Swell is determined by measuring the diameter of the extrudate immediately outside the orifice and dividing by the diameter of the orifice. Die Swell is reported as percent Die Swell. The diameter of the end of a six inch length of extrudate, measured from the orifice of the die, is measured. The percent Melt Strength is determined from the formula:

$$\frac{D - 0.1}{0.1} \times 100$$

wherein D is the diameter, in inches, of the extrudate supporting a six inch length of extrudate. If D is less than 0.1 inch, the Melt Strength is a negative number since there is no increase in the diameter of the extrudate. If D is greater than 0.1 inch, the Melt Strength is a positive number.

Elongation: ASTM-D638
Flexural Modulus: ASTM-D790
Flexural Strength: ASTM-D790
Heat Deflection Temperature: ASTM-D785
Izod Impact Strength: ASTM-D256
Rockwell Hardness: ASTM-D648
Tensile Strength: ASTM-D638

The mole percentages of the 5-sodiosulfoisophthalate acid (SIP) residues of the polyesters are determined by measuring the percent sulfur by X-ray florescence technique. The mole percentages of the diol and acid residues are determined by gas chromatography or NMR.

This invention will be further illustrated by a consideration of the following examples, which are intended to be exemplary of the invention. All parts and percentages in the examples are on a weight basis unless otherwise stated.

EXAMPLE 1

Poly(ethylene terephthalate) Copolyester containing 3.5 mole percent 1,4-Cyclohexanedimethanol and 0.5 mole percent 5-sodiosulfoisophthalic acid.

A 500 mL round bottom flask equipped with a ground glass head, a stirrer shaft, nitrogen inlet, and a side arm is charged with 142.59 g (0.735 mole) of dimethyl terephthalate, 4.44 g (0.015 mole) of dimethyl 5-sodiosulfoisophthalate, 91.26 g (1,472 mole) of ethylene glycol, 4.03 g (0,028 mole) of 1,4-cyclohexanedimethanol, 0.246 g (0,003 mole) of sodium acetate, 0.25 mL of a butanol solution of titanium tetraisopropoxide (0.96% titanium, 1.4 mL of an ethylene glycol solution of manganese acetate tetrahydrate (0.45% manganese), 1.9 mL of an ethylene glycol solution of cobalt acetate tetrahydrate (0.55% cobalt) and 3.2 mL of an ethylene glycol solution of antimony oxide (0.99% antimony).

The flask is then immersed in a Belmont metal bath and is heated with stirring for 1.5 hours at 200° C. and 2 hours at 210° C. After this time, the theoretical amount of methanol has been collected and 2.0 mL of a phosphorus compound, Zonyl A (1.02% P), is added to the reaction mixture. The bath temperature is increased to 280° C. the nitrogen inlet is clamped off and vacuum is applied to reduce the pressure in the flask to 0.1 mm of mercury. The temperature is maintained at 280° C. with stirring at the reduced pressure for 90 minutes. The metal bath is then lowered away from the flask, the vacuum outlet is clamped off, the nitrogen inlet is opened and the flask is allowed to come to atmospheric pressure under a nitrogen blanket. The copolymer is allowed to cool to room temperature. This melt phase prepared copolymer has an inherent viscosity of 0.60. The flask is broken to recover the product and the polymer is granulated to provide material with a particle size of about 3 mm. About 30 grams of the granulated polymer is placed in a 1.25 inch diameter glass column used for solid state polymerizations. The column is jacketed so that solvents such as ethylene glycol may be refluxed to provide heat to the column and the bottom of the column has a fritted glass surface so that inert gases such as nitrogen may be passed up through the column. The column is maintained at 198° C. using refluxing ethylene glycol and nitrogen is passed through the polymer granules at a rate of 4 cu. ft. per hour to remove evolved ethylene glycol as the polymer I.V. increases. In 18 hours, the polymer sample has an I.V. of 0.82.

Using the general procedure, 50 lbs of this copolyester is prepared in the form of ⅛ in. pellets for extrusion foaming experiments. The copolyester is dried at 160° C. in a dehumidifying dryer. It is then extruded in a single screw extruder at a melt temperature of 280° C. The diameter of the screw is 40 mm, L/D ratio is 30 and the nozzle die on the end of the extruder has a bore of 5 mm. Pentane blowing agent (2.5 wt percent based on amount of polymer present) is injected into the midpoint of the extruder. The molten foamed mixture is extruded through the nozzle die to produce a foamed rod at an extrusion rate of 15 lb/hr. and 32 rpm screw revolution. The rod has a good surface and good uniform foam cell structure. Even better foam cell structure is obtained when the copolyester composition contains 1 wt percent talc as an expansion nucleating agent.

When these foaming experiments are attempted using a poly(ethylene terephthalate) copolyester containing 3.5 mole percent 1,4-cyclohexanedimethanol but containing no 5-sodiosulfoisophthalic acid, the surface of the foamed rod is rough and the foam cell structure is quite irregular. This result is caused by the low melt viscosity of this copolyester.

EXAMPLE 2

Poly(ethylene terephthalate) Copolyester containing 3.5 mole percent 1,4-cyclohexanedimethanol and 0.5 mole percent 5-sodiosulfoisophthalic acid.

This copolyester is prepared according to the general procedure of Example 1. The solid stated pellets have an I.V. of 1.1. After drying, the pellets are extruded and foamed using the procedures of Example 1 except that nitrogen gas is used instead of pentane to provide the foaming action. This foamed rod has excellent cell structure because of the high melt viscosity of this copolyester.

Similarly good results are achieved with a poly(ethylene terephthalate) copolyester containing 0.5 mole percent 5-sodiosulfoisophthalic acid but no 1,4-cyclohexanedimethanol.

EXAMPLE 3

Poly(ethylene terephthalate) copolyester containing 5.0 mole percent 5-sodiosulfoisophthalic acid.

This copolyester is prepared according to the general procedure of Example 1. The solid stated pellets have an I.V. of 0.79. After drying, the pellets are extruded and foamed using the procedure of Example 1 using nitrogen gas. This foamed rod has an excellent cell structure because of the high melt viscosity of this copolyester.

EXAMPLE 4

Poly(ethylene terephthalate) copolyester containing 1.5 mole percent 5-sodiosulfoisophthalic acid.

This copolyester is prepared according to the general procedure of Example 1. The solid stated pellets have an I.V. of 1.0. A total of 100 g of the copolyester pellets are coated with 0.53 g of sodium carbonate ($Na_2CO_3$) dissolved in 5 mL of 60:40 water: acetone mixture by shaking the pellets in a polyethylene bag with the $Na_2CO_3$ solution. Citric acid monohydrate (0.64 g) dissolved in 5 mL of acetone is coated in a like manner on a separate sample of the copolyester pellets. The coated pellets are air dried and then dried in a vacuum oven at 100° C. The treated pellets are dry blended in a polyethylene bag to provide a copolyester composition containing 0.264% $Na_2CO_3$ and 0.32% citric acid monohydrate. These pellets are extruded as described in Example 1 to provide a smooth foamed rod.

Similarly good results are achieved using 2 wt percent azodicarbonamide instead of the $Na_2CO_3$/citric acid mixture.

EXAMPLE 5

Poly(ethylene terephthalate) copolyester containing 2.5 mole percent 5-sodiosulfoisophthalic acid.

This copolyester is prepared according to the general procedure of Example 1. The solid stated pellets have an I.V. of 0.75. After drying, the pellets are extruded and foamed using the procedure of Example 1 except that carbon dioxide gas in used instead of pentane to provide the foaming action.

EXAMPLE 6

Poly(ethylene terephthalate) copolyester containing 5 mole percent 2,6-naphthalenedicarboxylic acid and 3.5 mole percent 5-sodiosulfoisophthalic acid.

This copolyester is prepared according to the general procedure of Example 1. The solid stated pellets have an I.V. of 0.90. After drying, the pellets are extruded and foamed using nitrogen gas according to the general procedure described in Example 1.

The invention has been described in detail with particular reference to preferred embodiments thereof, but it will be understood that variations and modifications can be effected within the spirit and scope of the invention.

We claim:

1. A foamed article comprising a copolyester having an I.V. of about 0.70–1.20 dl/g and a melt viscosity sufficiently high to permit foaming during extrusion or molding operations, said copolyester consisting essentially of (A) repeat units from about 99.5 to about 95 mol % of an aromatic dicarboxylic acid having 8 to 12 carbon atoms and about 0.5 to about 5.0 mol % of a dicarboxylic acid sulfomonomer containing at least one metal sulfonate group attached to an aromatic nucleus, and (B) repeat units from at least one aliphatic or cycloaliphatic diol having 2 to 8 carbon atoms, said mole % being based on 100 mol % dicarboxylic acid and 100 mol % diol.

2. A foamed article comprising a copolyester according to claim 1 wherein said sulfomonomer is selected from the group consisting of sulfophthalic acid, sulfoterephthalic acid, sulfoisophthalic acid, 4-sulfonaphthalene-2,7-dicarboxylic acid, and dialkyl esters thereof having 8 to 14 carbon atoms.

3. A foamed article comprising a copolyester according to claim 2 wherein said sulfomonomer is 5-sodiosulfoisophthalic acid or dimethyl-5-sodiosulfoisophthalate.

* * * * *